Dec. 14, 1954  C. E. MARKQUART  2,696,693
WEED GUARD FOR FLY LURES
Filed Aug. 27, 1951

INVENTOR.
Carroll E. Markquart
BY
Williamson & Williamson
ATTORNEYS

United States Patent Office 2,696,693
Patented Dec. 14, 1954

2,696,693

WEED GUARD FOR FLY LURES

Carroll E. Markquart, Mound, Minn.

Application August 27, 1951, Serial No. 243,791

2 Claims. (Cl. 43—42.28)

This invention relates to fly-fishing lures. More particularly, it relates to a fly-fishing lure having means for preventing the same from becoming entangled with weeds and the like while being used in fishing activities.

A general object of my invention is to provide a novel and improved fly-fishing lure of cheap and simple construction and increased efficiency.

A more specific object is to provide a novel and improved fly-fishing lure capable of effective use in fishing activities despite the presence of considerable weeds, etc. in the fishing waters.

Another object is to provide a novel and improved fly-fishing lure constructed to cause the same to ride upwardly and over weeds and other obstacles in the fishing waters, meanwhile effectively preventing the hook of the lure from engaging such obstacles.

Another object is to provide a novel and improved and readily removable and transferable attachment for the bodies of various fly-fishing lures having various diameters and which will positively and effectively guard the hook of such lures against engaging weeds and the like during fishing operations.

Another object is to provide a guard attachment adjustable in size and constructed to increase the efficiency of the fly-fishing lure to which it is attached through its strong resemblance in appearance to the legs of the insect which the lure is supposed to represent.

Another object is to provide a novel and improved fly-fishing lure including a guard constructed to yieldably protect the hook of the lure and to swing inwardly in an arc to maintain such protection despite such yielding movement caused by the lure encountering an obstacle such as a weed.

These and other objects of my invention will more fully appear from the following description made in connection with the accompanying drawings, wherein like reference characters refer to the same or similar parts throughout the several views and, in which.

Figure 1:
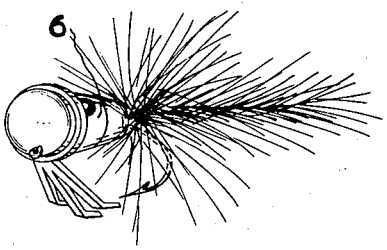
Fig. 1 is a perspective view of one embodiment of my invention.
Figure 2:
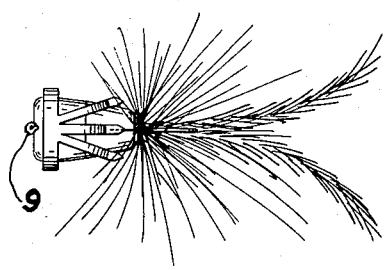
Fig. 2 is a bottom elevational view of the same.
Figure 3:
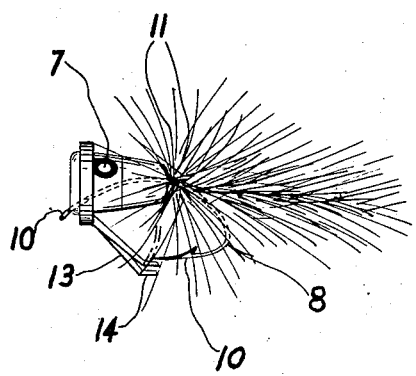
Fig. 3 is a side elevational view of the fly-fishing lure shown in Fig. 1.
Figure 4:
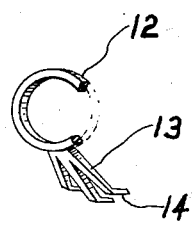
Fig. 4 is a fragmentary perspective view of the guard attachment.

One embodiment of my invention may include, as shown in Figs. 1–4, a main body or plug 6 which is a float body, being made preferably of wood or some other said light-weight material. As shown, this main body of the fly-fishing lure is generally frusto-conical in shape and its exterior surface is painted in a manner so that the body 6 will tend to resemble the main body structure of an insect. In this connection, an eye 7 is painted thereupon. Extending through the main body 6 is a hook indicated generally as 8 having an eyelet 9 which extends forwardly ahead of the main body 6 and a barbed end 10. As best shown in Fig. 3 the barbed end 10 of the hook is disposed below the main body 6 and approximately opposite the rear end of the same. Secured to the medial portion of the hook 8 adjacent the rear end of the main body 6 is some hackle 11 which is tied to the hook in the conventional manner and is utilized to camouflage the same.

Mounted on the forward end portion of the main body 6 is a ring member 12. This ring member, as shown, is made of an elastic material, preferably tempered rubber, and has a diameter slightly less than the conventional fly-fishing lure. The drawings in Figs. 1–3 illustrate the approximate size with respect to the ring member 12 of the main body of a conventional fly-fishing lure. This ring 12, because of its elastic material, is well-adapted for mounting of the same upon the forward end portion of the main body of the lure for lures of various diameters, both larger and smaller than the diameter of the lure shown in Figs. 1–3.

Extending outwardly and rearwardly from the ring member 12 is a plurality of guard arms 13. As best shown in Fig. 3, these guard arms extend outwardly to a point ahead and outside of the point of the barbed end 10 of the hook 8. The length of these arms 13 is such that when the same are forced inwardly the extreme outer ends thereof will pass in close proximity to the point of the barbed end 10. These arms 13 are made of a resilient material, preferably of tempered rubber, and preferably made integral with the ring 12.

As shown, the outer end portions of the guard arms 13 are formed into fingers 14. These fingers 14 angle rearwardly with respect to the guard arms 13 and extend substantially horizontally and in a plane substantially normal to the plane of the ring 12 when the same is mounted upon the main body 6 of the fly-fishing lure. The rear tips of these fingers 14 extend rearwardly to a point slightly rearward of the point of the barbed end 10 of the hook 8 and lie outside of the same. These fingers are also preferably made integrally with the ring 12 and the arms 13 and are preferably constructed of dark color so that the guard arms 13 and the fingers 14 cooperatively resemble strongly the legs of an insect which the entire lure is supposed to represent.

In use, the ring member 12 is applied to the main body 6 of the fly-fishing lure in substantially the position shown in Figs. 1–3. This may be readily accomplished by merely stretching the ring 12 sufficiently to permit the same to be slid rearwardly over the forward end of the main body 6. When this has been done, the lure may be connected to the leader and fly-casting operations are in order. The weight of the guard attachment, which is comprised of the ring 12, the arms 13 and the fingers 14, is of sufficiently small magnitude so that the additional weight provided thereby will not hinder fly-casting operations. When the lure is cast outwardly upon the fishing waters which, in many instances, have weeds such as lily pads riding upon the surface thereof, the lure shown will readily ride upwardly and over such weeds as the lure is being brought in by the fisherman. The guard arms 13 and the protecting fingers 14 will cause the lure to readily slide across such obstacles without engaging the same and without hindering the efficiency of the lure in any respect whatsoever but rather enhancing it.

When an obstacle such as a lily pad is struck by the lure, the guard fingers will prevent engagement of the weed by the barbed end 10 of the hook. If the weed is encountered in the termination of the flight of the lure, the impact will, of course, be sufficient to drive the fingers inwardly slightly. It should be noted, however, that this will not cause the protection for the barbed end 10 of the hook to be terminated, for the arcuate swing of the extreme outer ends of the guard arms 13 will still continue to afford such protection until such time as they are driven inwardly beyond the point. These arms 13 are made of a resilient material having sufficient rigidity so that it requires a fairly heavy impact to move their outer ends beyond this point. It should be noted that these fingers 14 extend substantially parallel to the barbed end 10 and provide no serious obstacle to a fish striking at same. To the contrary, they will yield readily and move inwardly so that the fish will become impaled upon the hook.

It should also be noted that the fingers 14, contrary to any guard element made of metal which might be provided, will not interfere with the impaling of a fish upon the barbed end of the hook when the fish strikes from the rear of the lure. Many fish approach a lure from the rear and when striking from this position often times will not become impaled upon the hook if a guard of a less flexible nature is utilized. If such a guard is used the fish will either receive a sharp jab and be frightened away or the entire lure will be thrust forwardly so that when the jaws of the fish close, the point of the hook will be outside thereof and thus the fisherman will miss his strike.

I have shown the guard in the form of an attachment which is readily removable from the main body of the fly-fishing lure and which is well-adapted for transfer to other fly-fishing lures having bodies of various diameters. The elastic nature of the ring 12 permits one of these attachments to be utilized on any number of various fly-fishing lures. It is contemplated, however, that this guard could be manufactured as a single part of a composite lure without provision for readily removing and transferring the same.

Thus, it can be seen that I have provided a novel and improved fly-fishing lure capable of cheap and simple construction and yet highly effective during use. The entire attachment, if manufactured as such, may be made integrally from an extremely simple die. In addition, the guard strongly resembles the legs of an insect in the position normally held during swimming operations so as to highly increase the effectiveness of the fly-fishing lure. I have found that such a fly-fishing lure obtains results when a lure without such an attachment will not create any interest in the fish. Moreover, the resilient nature of the guard arms permits the same to be used over and over during fishing operations for these arms immediately return to their original position and shape after a strike has been obtained.

It will, of course, be understood that various changes may be made in the form, details, arrangement and proportions of the various parts without departing from the scope of my invention.

What I claim is:

1. A fly-fishing lure assembly having in combination a float body having a forward end portion and having attachment means adjacent its forward end for securing a fly-line thereto and having a hook extending from its other end, hackle secured to and camouflaging said hook said hook extending rearwardly and downwardly and having a barbed end spaced vertically from said body, a closed ring member formed of elastic material and removably attached to said body in encircling and close-fitting frictionally engaging relation, said ring member being readily removable from said float body and because of its elastic nature adapted to be mounted on other and similar float bodies, a plurality of flexible but at least semi-rigid and resilient guard arms mounted on said ring member and extending rearwardly a substantial distance beyond the points of attachment to said ring member and outwardly a distance greater than the vertical distance between the barbed end of the hook and the adjacent surface of said float body, and finger elements mounted on the outer end portions of said arms and extending rearwardly therefrom to cooperate with said arms in preventing the hook from engaging weeds and the like as it is drawn through the water.

2. A fly fishing lure having in combination, a small float body having a substantially circular cross sectional shape and being adapted to be drawn through the water, a barbed end hook connected to said float body and extending rearwardly and downwardly therefrom, a closed elastic ring member having an internal diameter slightly less than the cross-sectional diameter of the forward end portion of said float body removably mounted on the forward end portion of said body and engaging the same by friction only, a plurality of semi-rigid but resilient guard arms mounted on said ring member and extending rearwardly therefrom and outwardly a distance greater than the vertical distance between the barbed end of said hook and the adjacent surface of said float body, and finger elements mounted on the outer end portions of said arms and extending rearwardly in planes substantially normal to the plane of said ring member to a point rearwardly of the barbed end of said hook, said finger elements cooperating with said arms in preventing said hook from engaging weeds when the lure is drawn through the water, said finger elements and said guard arms and said float body cumulatively resembling an insect with depending legs and thereby increasing the effectiveness of the lure.

References Cited in the file of this patent

UNITED STATES PATENTS

| Number | Name | Date |
| --- | --- | --- |
| 539,149 | Shattuck | May 14, 1895 |
| 847,266 | Upton | Mar. 12, 1907 |
| 1,313,567 | Ulrich | Aug. 19, 1919 |
| 1,583,199 | Taylor | May 4, 1926 |
| 1,851,529 | Stapf | Mar. 29, 1932 |
| 1,929,150 | Peckinpaugh | Oct. 3, 1933 |
| 2,152,971 | Parkins | Apr. 4, 1939 |
| 2,268,541 | Arboyast | Jan. 6, 1942 |
| 2,450,796 | Heimark | Oct. 5, 1948 |

FOREIGN PATENTS

| Number | Country | Date |
| --- | --- | --- |
| 937,342 | France | Dec. 13, 1946 |